United States Patent Office 2,925,445
Patented Feb. 16, 1960

2,925,445

PRODUCTION OF CHLORINATED BICYCLIC HYDROCARBONS

Henry Bluestone, Shaker Heights, Ohio, assignor, by mesne assignments, to Shell Development Company, Emeryville, Calif., a corporation of Delaware No Drawing. Application December 22, 1952
Serial No. 327,458

4 Claims. (Cl. 260—648)

This application is a continuation-in-part of copending application Serial No. 156,716, filed April 18, 1950, and now U.S. Patent 2,676,132.

The present invention relates to a new composition of matter, the method for producing same, and to a novel intermediate therefor. More particularly the present invention relates to the production of a novel chlorinated, bicyclic, dienic hydrocarbon and its intermediate.

The dienic product of the present invention is useful as a pesticide in itself and also in the preparation of other valuable and potent pesticides. Thus, this compound exhibits fungicidal and insecticidal activity without concomitant phytotoxity thereby insuring safe usage on plant life. It is also stable to acidic and alkaline reagents, thereby allowing for a wide range of formulations and uses alone or in conjunction with other pesticidal agents.

The dienic product is particularly defined as 1,2,3,4,7,7-hexachloro-bicyclo-[2.2.1]-2,5-heptadiene. In accordance with the present invention it may be prepared by reacting hexachlorocyclopentadiene and vinyl chloride to result in the novel intermediate 1,2,3,4,5,7,7-heptachloro-bicyclo-[2.2.1]-2-heptene, which in turn may be dehydrohalogenated to produce the above named dienic end product.

The following is a specific example showing the preparation of the heptachloro intermediate:

Example I

A 3-liter flask equipped with a sparger and a thermometer was charge with 2,550 grams of hexachlorocyclopentadiene having a purity of approximately 90%. Gaseous vinyl chloride in the reaction vessel was maintained at 2 atmospheres (absolute pressure) and the temperature of the reacting liquid was maintained at $120 \pm 2°$ C. The reaction was discontinued after 48 hours, and the reaction solution was fractionated to separate unchanged hexachlorocyclopentadiene and the product. At a distillation pressure of 20 mm. Hg abs. the fraction distilling at 122–130° C. was separated; this material was unchanged hexachlorocyclopentadiene. A second fraction, which solidified in the receiver, boiling between 130–150° C. was also collected. This fraction was melted and transferred to a beaker, cooled and brought on a suction filter in order to separate additional hexachlorocyclopentadiene. The residue on the filter was dissolved in methanol, and treated with decolorizing charcoal at the boiling point of the solution; the methanol was completely evaporated from the solution and the crystals which resulted were air dried. In this way 694.5 grams of a product melting between 125–136° C. was recovered.

*Analysis.*—Calculated for $C_7H_3Cl_7$: Carbon, 25.07%; hydrogen, .86%; chlorine, 74.1%. Found: Carbon, 25.5%; hydrogen, .86%; chlorine, 74.1, 74.4%.

The compound thus obtained is the adduct of hexachlorocyclopentadiene with vinyl chloride, 1,2,3,4,5,7,7-heptachloro-bicyclo-(2.2.1)-2-heptene, represented by the structural formula:

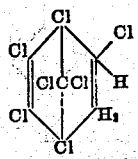

The specific process shown in the foregoing example may be varied with respect to conditions utilized.

The temperature of reaction may be within the range of about 100° to about 200° C. The pressure in a closed reaction vessel will necessarily vary with the temperature employed since one of the reactants is normally gaseous. Elevated pressures are desirable in view of the fact that one mole of product is formed from 2 moles of reactants.

The reaction may be carried out at atmospheric pressures, for example by bubbling the gaseous reactant through the heated hexachlorocyclopentadiene in a liquid phase.

The rate of reaction will vary with the temperature and the pressure employed, and will usually require four or more hours. A lesser time than is required for reaction completion will still result in the desired product, but is uneconomical.

The product produced is a 1:1 adduct of the two reactants. Consequently a 1:1 mole ratio of reactants is desirable. However, the gaseous component can be employed in a lesser proportion than 1:1 mole ratio with a constant replenishment thereof as the reaction ensues. An excess of such component may also be used.

The reaction can be accomplished in the presence of a relatively inert solvent under the conditions utilized; however, since hexachlorocyclopentadiene is itself a liquid, the use of such additional solvent is not necessary.

When vinyl bromide is used in place of the vinyl chloride of the foregoing example, under essentially the same conditions, the 1:1 adduct of hexachlorocyclopentadiene and vinyl bromide is obtained, namely, 5-bromo-1,2,3,4,7,7-hexachloro-bicyclo-(2.2.1)-2-heptene.

The following is an example of preparing the hexachlorobicycloheptadiene from the product of Example I:

Example II

Heptachlorobicycloheptene (product of Example I) was treated with ethanolic potassium hydroxide solution at the reflux temperature of ethanol for approximately 4 hours; the solution contained 3 moles of potassium hydroxide for each mole of the chloro compound present therein and its concentration with respect to potassium hydroxide was approximately 3 molar. The reaction mixture became very dark and inorganic salts were thrown out of solution. These salts were separated on a filter and most of the ethanol was removed, by evaporation, from the remaining solution. The concentrated solution which resulted was stirred into water and the mixture was acidified with hydrochloric acid. Most of the water was decanted from the resulting two-phase mixture and the residue was extracted with diethyl ether. This step in the process resulted in the formation of an emulsion which separated only slowly. The separated ether phase was dried over anhydrous sodium sulfate and the ether was evaporated, leaving a black, oily material. This black oily material was distilled in vacuo and the cut boiling between 128–145° C. at 18 mm. Hg abs. was collected. The material in this fraction represented a yield of approximately 78% based on the amount of heptachlorobicycloheptene taken for reaction.

*Analysis.*—Calculated for $C_7H_2Cl_6$: Carbon, 28.1%; hydrogen, 0.67%. Found: Carbon, 28.5%; hydrogen, 0.81%.

The compound thus obtained is 1,2,3,4,7,7-hexachloro-bicyclo-(2.2.1)-2,5-heptadiene represented by the structural formula:

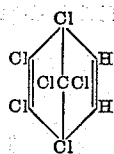

The pure compound obtained by fractional distillation in vacuo has the following physical characteristics:

The melting point is about −4° C., the density ($d^{20}$) is 1.664 g./ml. and the refractive index ($n_D^{25}$) is 1.5529. The product boils at a temperature of about 75° C. at 0.4 mm. mercury pressure (absolute) and at about 149° C. (with decomposition) at 30 mm. mercury pressure (absolute).

This compound is also obtainable by the similar dehydrohalogenation (dehydrobromination) of 5-bromo-1,2,3,4,7,7 - hexachloro-bicyclo-(2.2.1)-2-heptene by the use of alcoholic potassium hydroxide in essentially the same manner as it was obtained in Example II from the heptachlorobicycloheptene.

The dehydrohalogenation reaction may be carried out by using other alkali metal hydroxides such as sodium hydroxide. Similarly, the solvent may be other than ethanol, such as methanol, propanol, butanol, dioxane, etc. The solvent should preferably mutually dissolve the reactants and preferably boil within the temperature range desired for reaction. This temperature may vary between about 50 and about 150° C. Thus ethanol is a preferred solvent.

The concentration of alkaline material may vary between about 2% to about a saturated solution in the solvent used. The ratio of quantity of alkaline material to the organic reactant may vary between about stoichiometric quantities or even less to large excess thereof such as 3 to 6 moles or more per mole of organic reactant.

The new dienic composition of this invention has many uses other than those already enumerated. Thus, it can be used as a plasticizer and tackifier in many resinous compositions as well as an impregnant and fire-proofing agent in view of its high degree of halogenation.

This composition is also valuable as a starting compound in the preparation of perfumes, medicinals, and other organic compounds useful in the arts and sciences.

In addition, the present compound is very valuable as an intermediate in the preparation of the valuable insecticides known as 711 and 269 which are respectively the adduct of the present compound with cyclopentadiene and the 6,7 epoxide thereof described and claimed respectively in the copending applications of Rex E. Lidov, Serial No. 325,881, filed December 13, 1952, and now U.S. Patent 2,717,851, and Henry Bluestone, Serial No. 156,716, filed April 18, 1950, and now U.S. Patent 2,676,132.

I claim as my invention:
1. A compound having the formula:

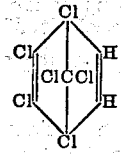

2. The method of forming 1,2,3,4,7,7-hexachloro-bicyclo-(2.2.1)-2,5-heptadiene which comprises reacting a vinyl halide of the group consisting of vinyl chloride and vinyl bromide with hexachlorocyclopentadiene in a Diels-Alder manner to form their equi-molar adduct, and dehydrohalogenating said adduct by reacting it with an alkali metal hydroxide in the presence of a solvent selected from the group consisting of lower alkanols and dioxane.

3. The method of forming 1,2,3,4,7,7-hexachloro-bicyclo-(2.2.1)-2,5-heptadiene which comprises dehydrohalogenating 1,2,3,4,5,7,7 - heptachloro-bicyclo-(2.2.1)-2-heptene by reacting it with an alkali metal hydroxide in the presence of a solvent selected from the group consisting of lower alkanols and dioxane.

4. The method of forming 1,2,3,4,7,7-hexachloro-bicyclo-(2.2.1)-2,5-heptadiene which comprises dehydrohalogenating 5-bromo - 1,2,3,4,7,7 - hexachloro-bicyclo-(2.2.1)-2-heptene by reacting it with an alkali metal hydroxide in the presence of a solvent selected from the group consisting of lower alkanols and dioxane.

References Cited in the file of this patent
FOREIGN PATENTS 498,176    Belgium _____ Oct. 14, 1950

OTHER REFERENCES

Krynitsky et al.: Jour. Am. Chem. Soc., vol. 69, pp. 1918–20 (1947).